United States Patent [19]

Smilanick

[11] Patent Number: 5,586,652
[45] Date of Patent: Dec. 24, 1996

[54] BICYCLE TORQUE COUPLING

[76] Inventor: Steve-Frank Smilanick, 318 Zola Ave., Roseville, Calif. 95678

[21] Appl. No.: 122,368

[22] Filed: Sep. 16, 1993

Related U.S. Application Data

[63] Continuation-in-part of Ser. No. 89,108, Jul. 12, 1993, Pat. No. 5,431,507.

[51] Int. Cl.$^6$ .................................................. B65D 85/00
[52] U.S. Cl. ........................... 206/335; 190/109; 190/117
[58] Field of Search ................................... 206/335, 521; 190/108–111, 115–119, 127

[56] References Cited

U.S. PATENT DOCUMENTS

| | | | |
|---|---|---|---|
| 3,304,099 | 2/1967 | Jankowski | 280/287 |
| 3,463,228 | 8/1969 | Hearn | 166/181 |
| 4,053,248 | 10/1977 | Schultenkamper et al. | 403/337 |
| 4,252,335 | 2/1981 | Brenner | 280/287 |
| 4,462,606 | 7/1984 | Hon | 288/278 |

OTHER PUBLICATIONS

Space Savers advertisement, foldable bicycle.
Manufacturer unknown, advertisement for HardCase™, date unknown, 1 page.
Nashbar, advertisement for Deluxe Travel Bag, date unknown, 1 page.
Montague Corporation, advertisement for Airliner Bicycle Case, date unknown, 1 page.
Bike Pro USA, Advertisement for bicycle cases, 1993, 1 page.
Mike Koenig, "The Sky's No Limit", *Bicycling* Magazine, Jan. 1993, pp. 30–31.

*Primary Examiner*—Jimmy G. Foster
*Attorney, Agent, or Firm*—Bernhard Kreten

[57] ABSTRACT

A torque transmitting, bicycle frame coupling (50) is provided which connects to the frame tubes (1, 11) of a bicycle. The coupling (50) replaces a portion of the tubes (1, 11) and has clutch teeth (3, 7) on their engaging faces. Installation of two such couplings (50) allows a standard bicycle with standard wheels to be temporarily divided into two pieces, leaving sheathed component cables attached, but removing then from the frame tubes (96, 98) through use of quick connect cable clips (74). Once divided, the bicycle fits in a case (100) with a combined height, width and girth measurement no larger than 62 linear inches and can then be put back together with no loss of original frame geometry or stiffness. Each coupling (50) is actuated, pulling the tubes (1, 11) together and joining them through use of specialized clutch teeth (3, 7) under compression provided by a threaded lug (2), a removeable-shoulder lug (9) with a removeable shoulder (4) and a threaded coupling nut (5). The removeable shoulder (4) makes the nut (5) and shoulder (4) replaceable, and makes possible an additional shoulder (10) on the tube connecting end of the removeable-shoulder lug (9) to keep the nut (5) from slipping onto the tube (11).

4 Claims, 13 Drawing Sheets

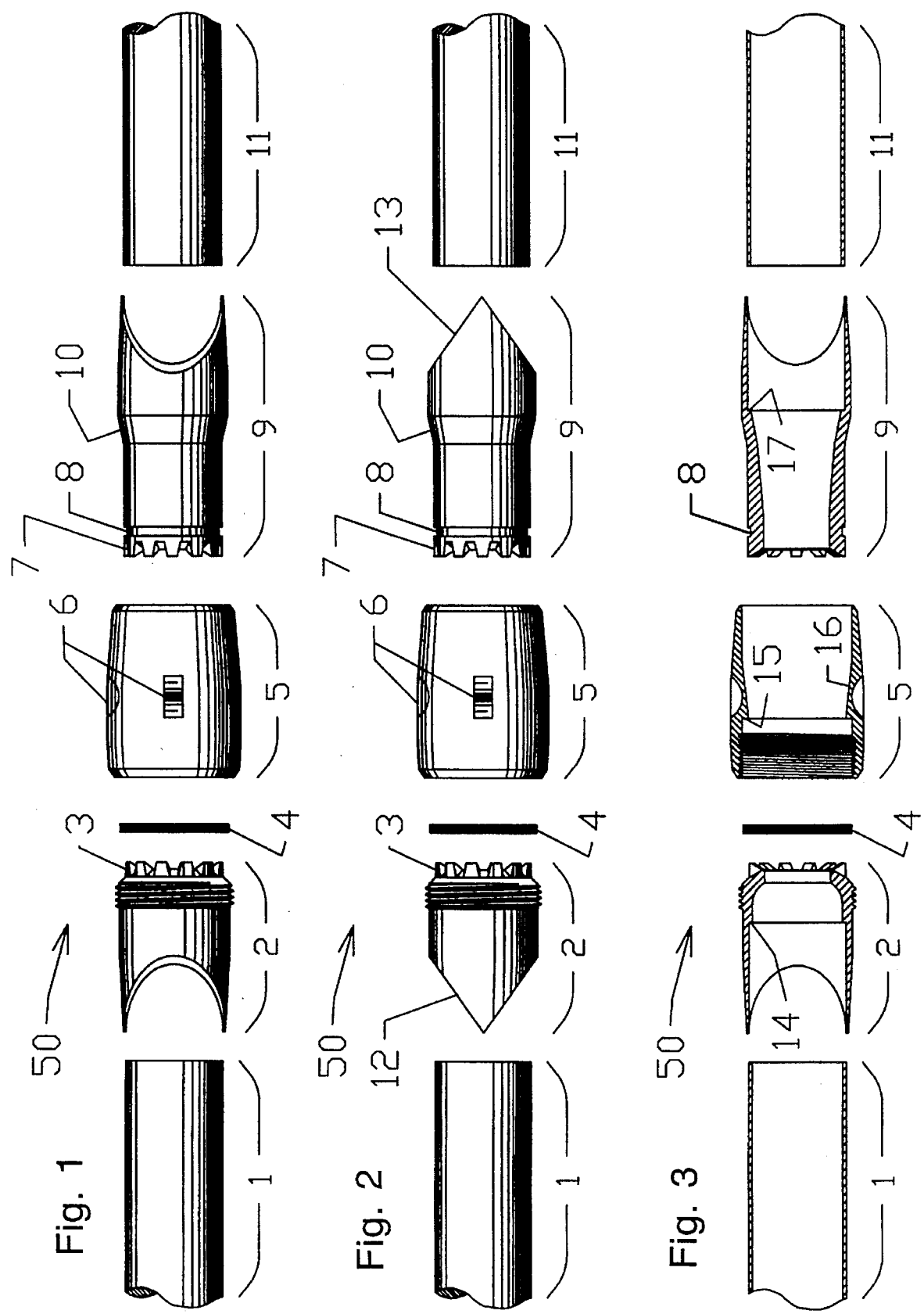

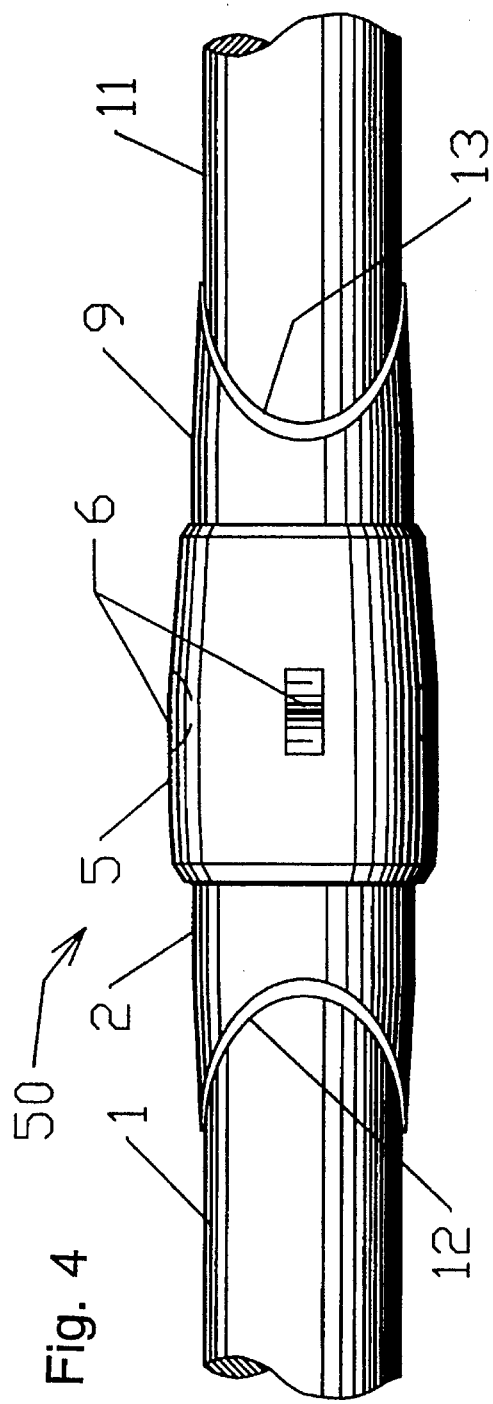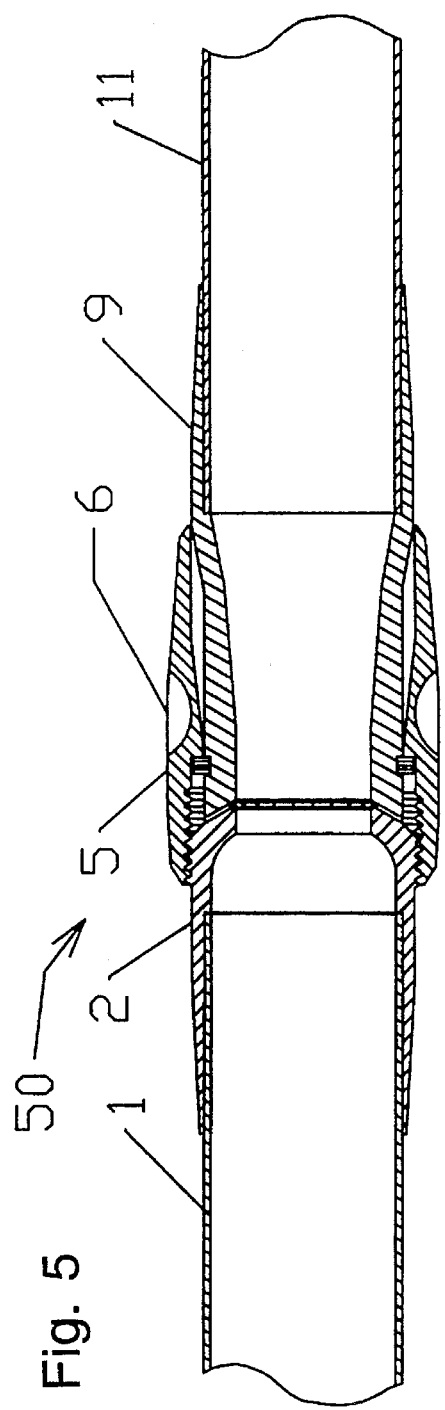

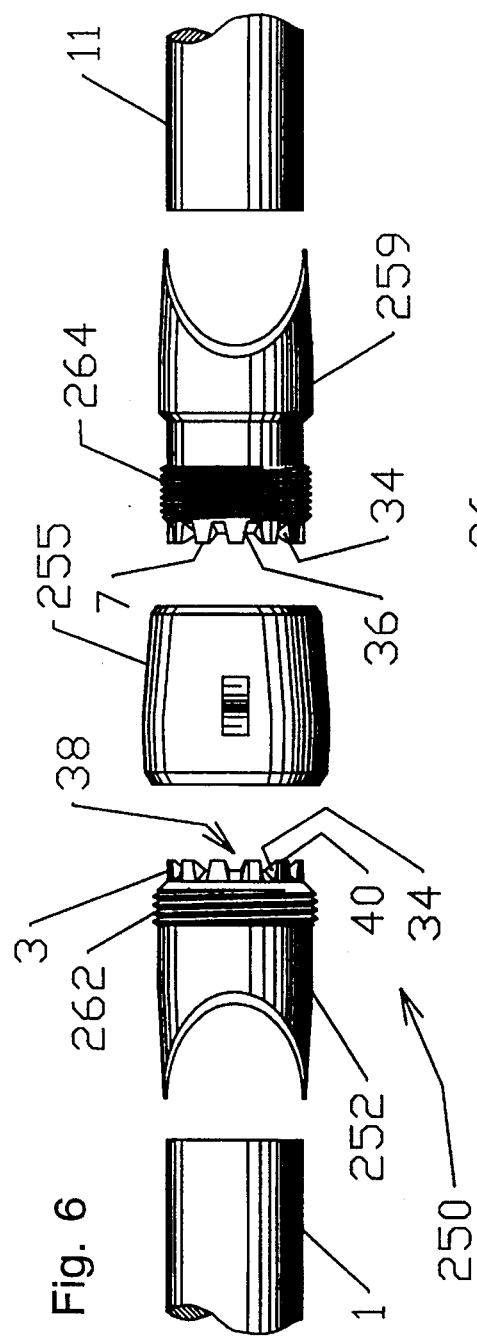
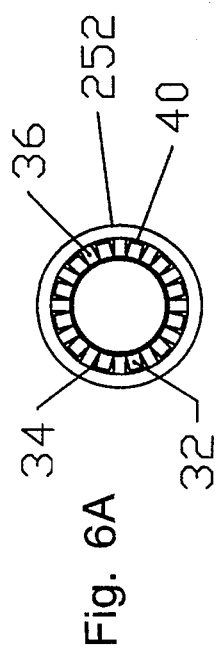
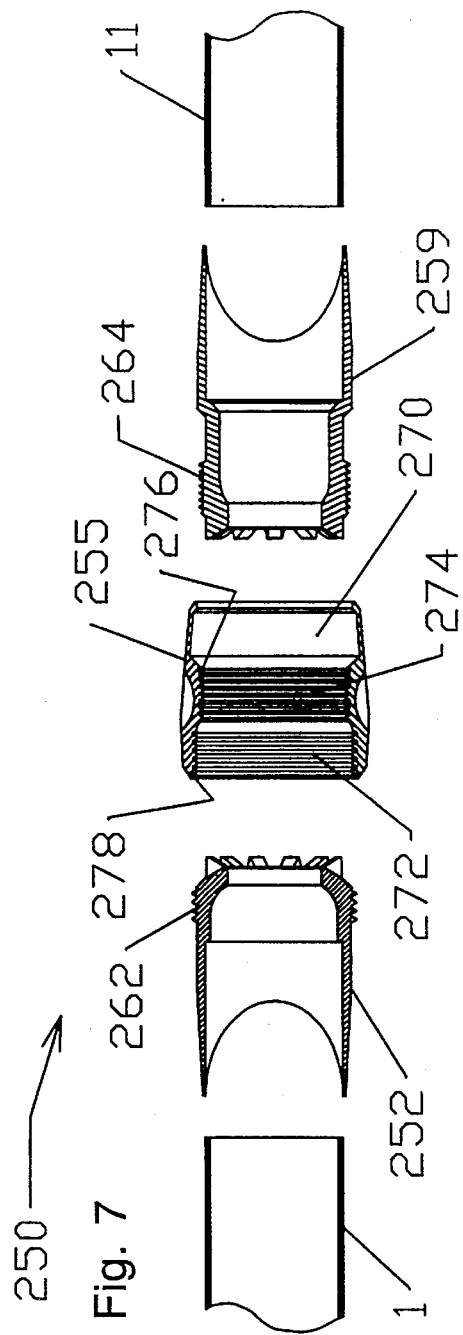

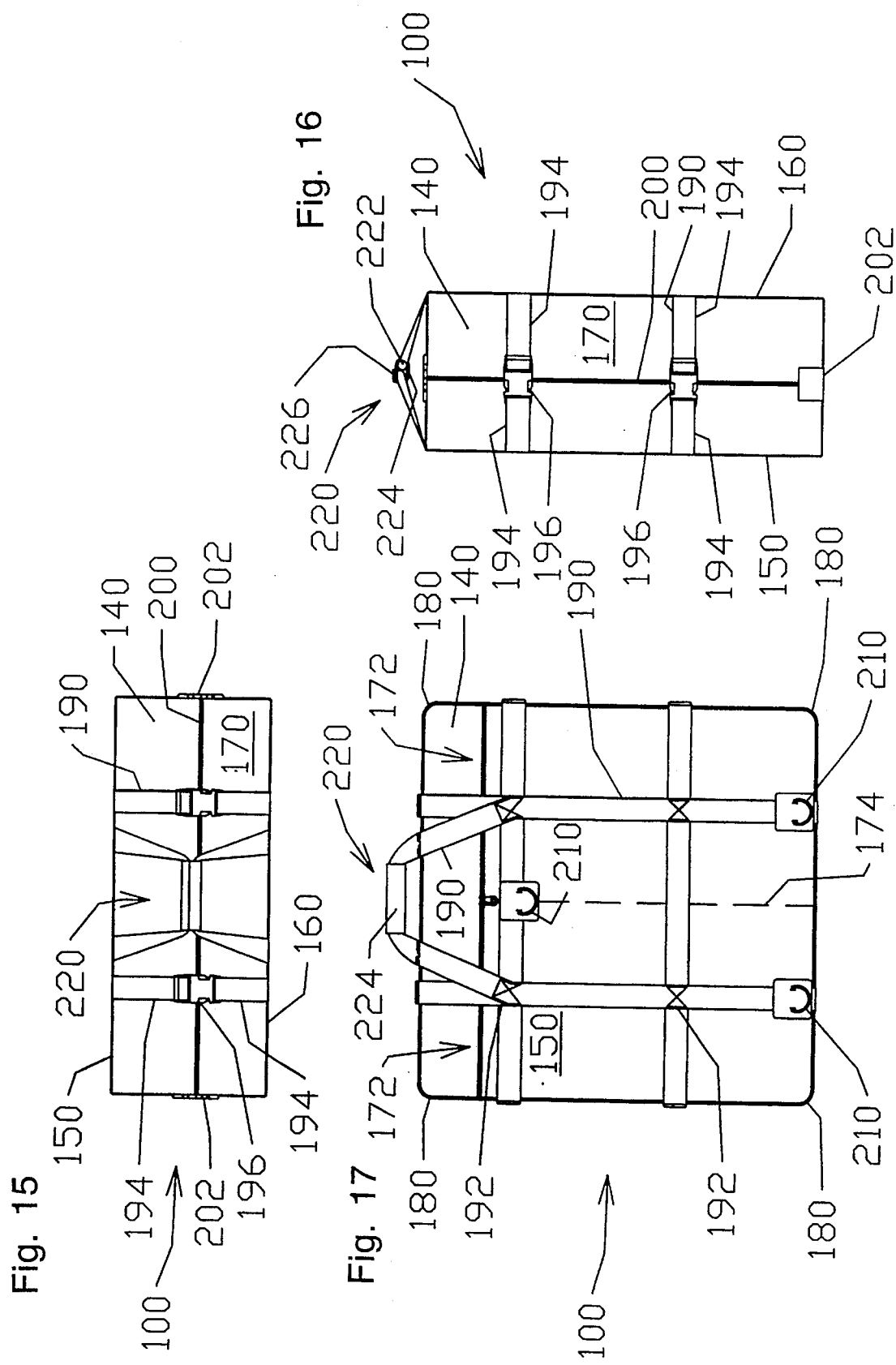

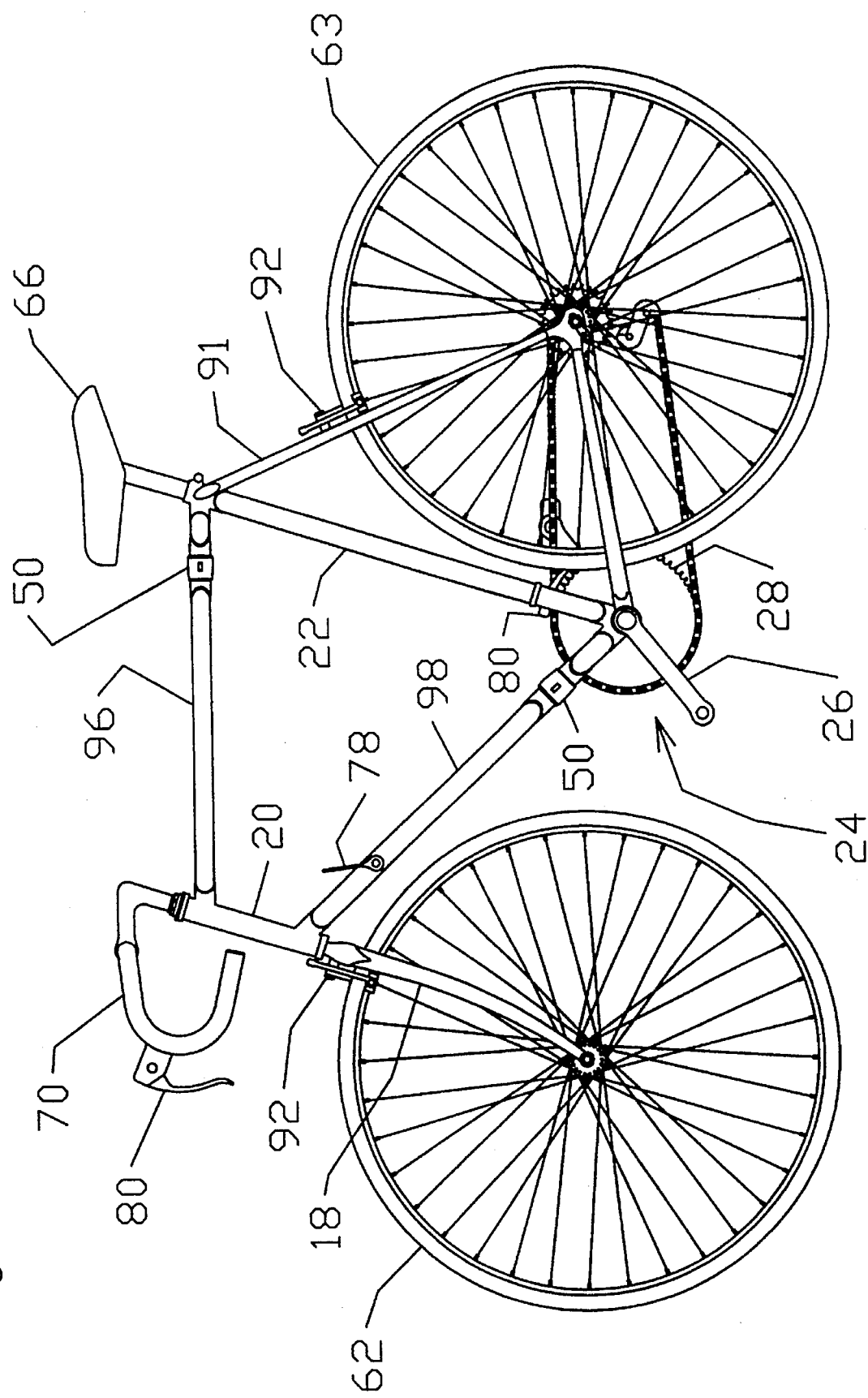

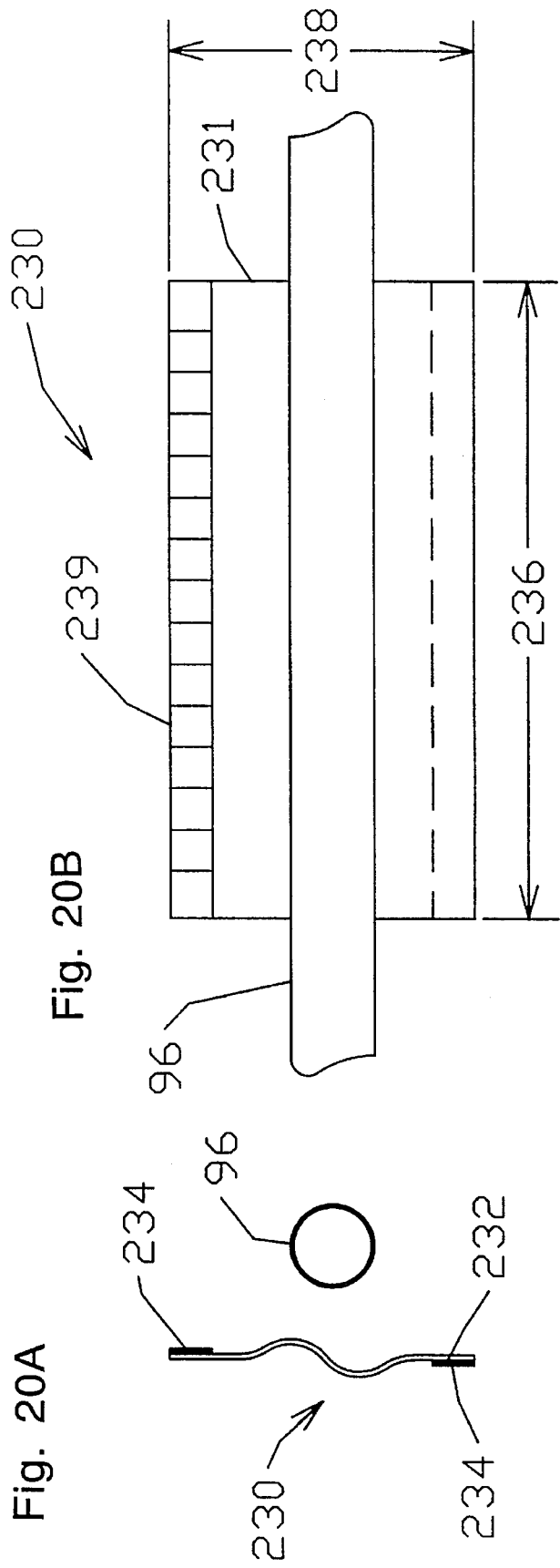
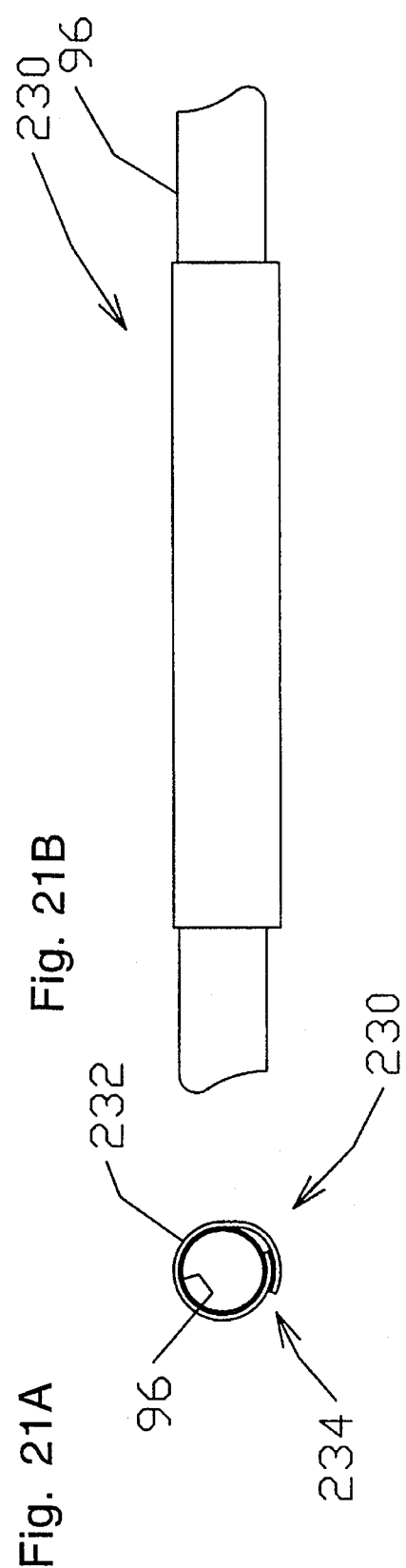
Fig. 20A Fig. 20B Fig. 21A Fig. 21B

BICYCLE TORQUE COUPLING

CROSS REFERENCE TO RELATED APPLICATION

This patent is a continuation-in-part of the patent application Ser. No.: 08/089,108 filed Jul. 12, 1993, U.S. Pat. No. 5,431,507.

FIELD OF THE INVENTION

The following invention relates generally to bicycles which have frames dividable and recombinable through a coupling and a method and apparatus for storing such a bicycle. More specifically, this invention relates to a bicycle frame tube coupling which rigidly joins pieces of the frame together, and a method of dividing the frame which facilitates storing of the entire bicycle in a case which complies with size requirements of common carriers for non-oversized luggage.

BACKGROUND OF THE INVENTION

For many years bicycles have been made to fold or break down for storage and transportation purposes. Many are adequate for the two preceding purposes, some even boasting to be allowed on an airline without an extra baggage charge, but lack the ride and style desired by avid cyclists. My invention combines all of the best time proven features of a standard bicycle with the added feature of being able to take the frame apart to fit in a case that is not over 62 inches in height, width and girth (the limit for regular sized luggage on U.S. and international airlines and other common carriers).

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | PATENT NO. | ISSUE DATE |
| --- | --- | --- |
| Jankowski | 3,304,099 | |
| Hearn | 3,463,228 | August 26, 1969 |
| Schultenkamper, et al. | 4,053,248 | October 11, 1977 |
| Brenner | 4,252,335 | February 1981 |
| Horn | 4,462,606 | July 31, 1984 |

OTHER PRIOR ART

Advertisement for Super Savers, foldable bicycle.

The patent to Brenner teaches a collapsible bicycle that uses standard plumbing pipe unions, adapted to fit on three places of a bicycle. Though this invention may be used in a similar fashion to Brenner, it is different in many ways, the most important of which are: first, the coupling of this invention uses a removeable shoulder on a lug end, not a permanently fixed flanged end; second, this invention is for a coupling that has specialized clutch teeth cut onto engaging faces instead of flat surfaces, or a mere alignment pin; third, this invention does not involve the adaptation of three, standard, off the shelf, plumbing parts to fit a bicycle. It is for a custom made, light weight, strong, aerodynamic, torque transmitting coupling of which only two are needed to adapt a bicycle for frame subdivision.

The removeable shoulder feature of one coupling of this invention adds positive things to the coupling over the teachings of Brenner. First, it allows the nut to be installed from the front of the lug so another shoulder can be cut on the rear to keep the nut from sliding off the back and scratching the frame paint. Brenner teaches no such provision. A removeable shoulder can also be easily replaced. The nut can as well, because it is the removeable shoulder that keeps it on and not a permanently fixed flange. The coupling taught by Brenner would require the melting of solder or cutting to be able to remove and replace the nut if damaged, or to replace the whole coupling end if the flange were damaged.

Use of a differential thread in an alternative embodiment of the coupling of this invention is also distinguishable from the teachings of Brenner. The differential thread, by its nature, allows a tighter fit in the coupling teeth when the nut is tightened. It also eliminates the use of a flange on the coupling nut to draw the lug ends together.

The specialized teeth on the couplings' engaging faces mesh together with zero backlash, resisting shock and torsional forces the frame might experience during use because of uneven terrain and pedaling motions. There will be no twisting. The coupling taught by Brenner will likely slip and twist because the faces of his frame tube couplings are smooth.

The tube accepting ends of the coupling are also much improved over the teachings of Brenner. The lug ends of this invention taper thinner on the outer diameter towards the outside ends and are angle cut on two sides to produce points 180 degrees from each other. These two attributes allow this coupling to better distribute stresses put on the tube connection points during bicycle use. The taper gradually reduces the cross sectional area, and the angle cut spreads the intersection point of lug and tube out over a longer distance so it is not all in the same plane which lies perpendicular to the polar axis of the frame tube. The lugs taught by Brenner were not tapered and ended bluntly on the ends.

In addition, this invention adds the novelty of being able to fit a standard bicycle with standard wheels in a case that does not exceed 62 total linear inches in height, width and girth if it is installed correctly. No prior art methods exist for determining the dimensions for a case that will hold all of the parts of a standard bicycle without going over the 62" limit, and no methods exist for determining how a bicycle must be divided into pieces (the frame included) so it will all fit within a case of those dimensions.

Furthermore, none of the prior art teaches quick connect cable clips which are essential on a bicycle with component cables that are to be packaged through use of the torque couplings, and no method is taught by the prior art for using the clips with the torque couplings, the quick connect cable clips and the case of this invention.

SUMMARY OF THE INVENTION

One primary feature of the invention is a coupling that can join bicycle frame tubes end to end with minimal weight addition, and preserve the original geometry and stiffness of the frame. Preservation of such features is very important to avid cyclists. The coupling has two lugs that join together with a coupling nut and replaces a small segment of tubing cut from the original frame. Both lugs have inner faces cut with clutch teeth that interlock when the coupling nut pulls them together. The design is compact, light and strong.

If more than one coupling is properly installed in places on a standard frame, the frame can be divided, allowing the resulting pieces to fit in a case having dimensions acceptable for handling by airlines and other carriers without requiring additional changes or other difficulties. If additional quick connect cable clips are installed as well, according to this invention, an entire standard bicycle can be broken down and packaged in the case of this invention. The case is chosen to fit the bicycle's wheel diameters and with a maximum girth while still comprising not more than 62 total linear inches of size. The bicycle can later be reassembled to yield a bicycle that rides exactly like the original, with no loss of the original frame geometry or stiffness, two things which are very important to avid cyclists.

OBJECTS OF THE INVENTION

Accordingly, it is a primary object of this invention to provide a method for temporarily dividing the frame of a bicycle into two or more parts, each part small enough to fit within a case having not more than 62 total linear inches of height plus width plus girth.

Another object of this invention of to provide a differential thread coupling to securely hold together frame tube portions connected to lugs of the coupling.

A further object of this invention is to provide a coupling with teeth that are tapered and will allow compensation for wear due to hard use by bringing them closer together through tightening of the coupling nut. The fact that the teeth can be pressed together with zero backlash also helps to prevent the coupling from wiggling and working the coupling nut loose during hard use.

Viewed from a first vantage point, it is an object of this invention to provide a method for forming a frame of a bicycle that is temporarily dividable into two or more separate parts and recombinable into a single rigid unit, the frame composed of individual tubes, the steps of the method including providing a square planar template having a height and length similar to a diameter of wheels of the bicycle, aligning the template with a first area of the frame, aligning the template with a second area of the frame, the first and second portions including all of the frame with an overlapping area between the first area and the second area, and providing a detachable coupling on each tube within the overlapping area of the frame; whereby detachment of the couplings divides the frame into a first area and a second area, each area having dimensions not greater than a diameter of the wheels.

Viewed from a second vantage point, it is an object of this invention to provide a case for containing a disassembled bicycle, the case comprising in combination an exterior surface formed of flexible material, the exterior surface forming a periphery of the case, means for distributing forces passing through the exterior surface, coupled to the exterior surface, and the exterior surface having two similarly sized square surfaces oriented in a parallel, spaced relationship with each other, each square surface having a height and width not less than a diameter of wheels of the bicycle.

Viewed from a third vantage point, it is an object of this invention to provide a method of storing a disassembled bicycle within a case having an external surface including two similarly sized square surfaces oriented in a parallel, spaced relationship, the square surfaces having a height and width not less than a diameter of wheels of the bicycle, the disassembled bicycle including two wheels, and a frame with multiple separate portions including a first portion having a front fork and a head tube therein and a second portion having a rear drop out, bottom bracket and seat tube therein, the method including the steps of placing a first wheel in the case with a rim of the wheel oriented in a plane parallel to the square surfaces and adjacent a first square surface, placing the separate portions of the frame adjacent the first wheel on a side of the first wheel distant from the first square surface, and placing a second wheel adjacent the separate portions of the frame on a side of the frame portions distant from the first wheel.

Viewed from a fourth vantage point, it is an object of this invention to provide a coupling for detachably and reattachably uniting two tubes of a bicycle frame together along a common central axes, the coupling comprising in combination a first lug fixedly attached to a first tube, the first lug including a means for rotably supporting a nut, a second lug fixably attached to a second tube, the second lug including a means for rotably supporting the nut, the nut including a means for drawing the first lug and the second lug toward each other along their common central axes, and means for resisting rotational displacement of the first lug with respect to the second lug; whereby the coupling provides a rigid union of the two tubes.

These and other objects will be made manifest when considering the following detailed specification when taken in conjunction with the appended drawing figures.

BRIEF DESCRIPTION OF THE DRAWINGS

FIG. 1 is a component view showing the order of placement of the individual parts of the invention with external threads, grooves, shoulders, slots, teeth, and a removeable shoulder.

FIG. 2 is a view of that which is shown in FIG. 1 turned 90 degrees axially.

FIG. 3 is sectional view of that which is shown in FIG. 1 additionally showing bores, internal shoulders, tapers and threads.

FIG. 4 is an assembly view of a portion of this invention.

FIG. 5 is a sectional view of that which is shown in FIG. 4.

FIG. 6 is a component view of an alternative embodiment of that which is shown in FIG. 1 revealing a coupling utilizing a differential thread to pull two threaded lugs together.

FIG. 6A is an end view of a portion of that which is shown in FIG. 6.

FIG. 7 is a sectional view of that which is shown in FIG. 6 additionally showing bores, internal shoulders, tapers and threads.

FIG. 15 is a top view of a case to pack the bicycle in.

FIG. 16 is a side view of the case of FIG. 15.

FIG. 17 is a front view of the case of FIG. 15.

FIG. 19 is a view of an assembled bicycle with two couplings installed (cables removed for clarity).

FIG. 20A is a front view of a frame tube and a piece of frame tube padding prior to installation.

FIG. 20B is an end view of that which is shown in FIG. 20A.

FIG. 21A is a front view of a piece of frame tube padding installed on a frame tube.

FIG. 21B is an end view of that which is shown in FIG. 21A.

FIG. 31 showing a successive step following that which is shown in FIG. 30 with the rear frame section, chain ring down, over the front section with the rear drop outs in the lowest corner with the fork tips extending in between the chain stays, the brake calipers in between the seat stays and the seat tube; FIG. 32 showing a successive step following FIG. 31 with the front wheel put on top and with the crank arm and brake hoods through its spokes.

FIG. 34 showing a successive step following that which is shown in FIG. 33 with the front wheel on top and with the crank arm through the spokes.

DESCRIPTION OF PREFERRED EMBODIMENTS

Figure 8:
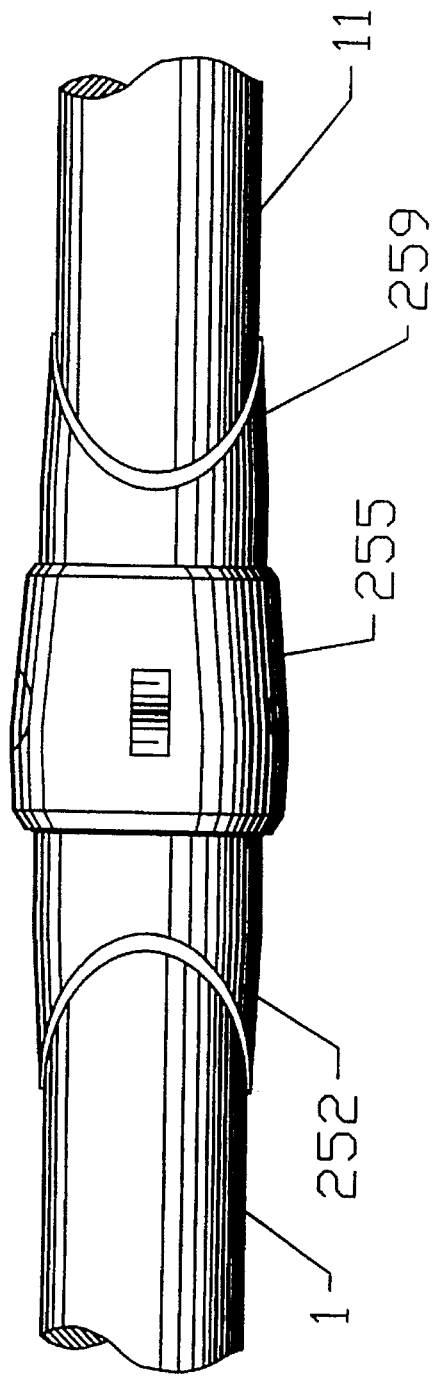
FIG. 8 is an assembly view of the coupling shown in FIG. 6 utilizing the differential thread concept.
Figure 9:
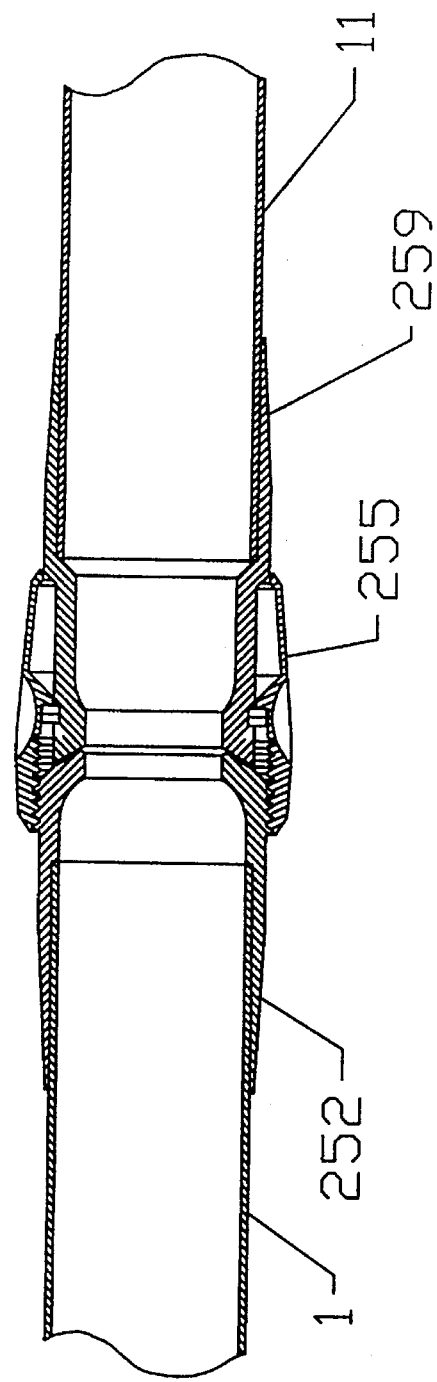
FIG. 9 is a sectional view of that which is shown in FIG. 8.
Figure 10:
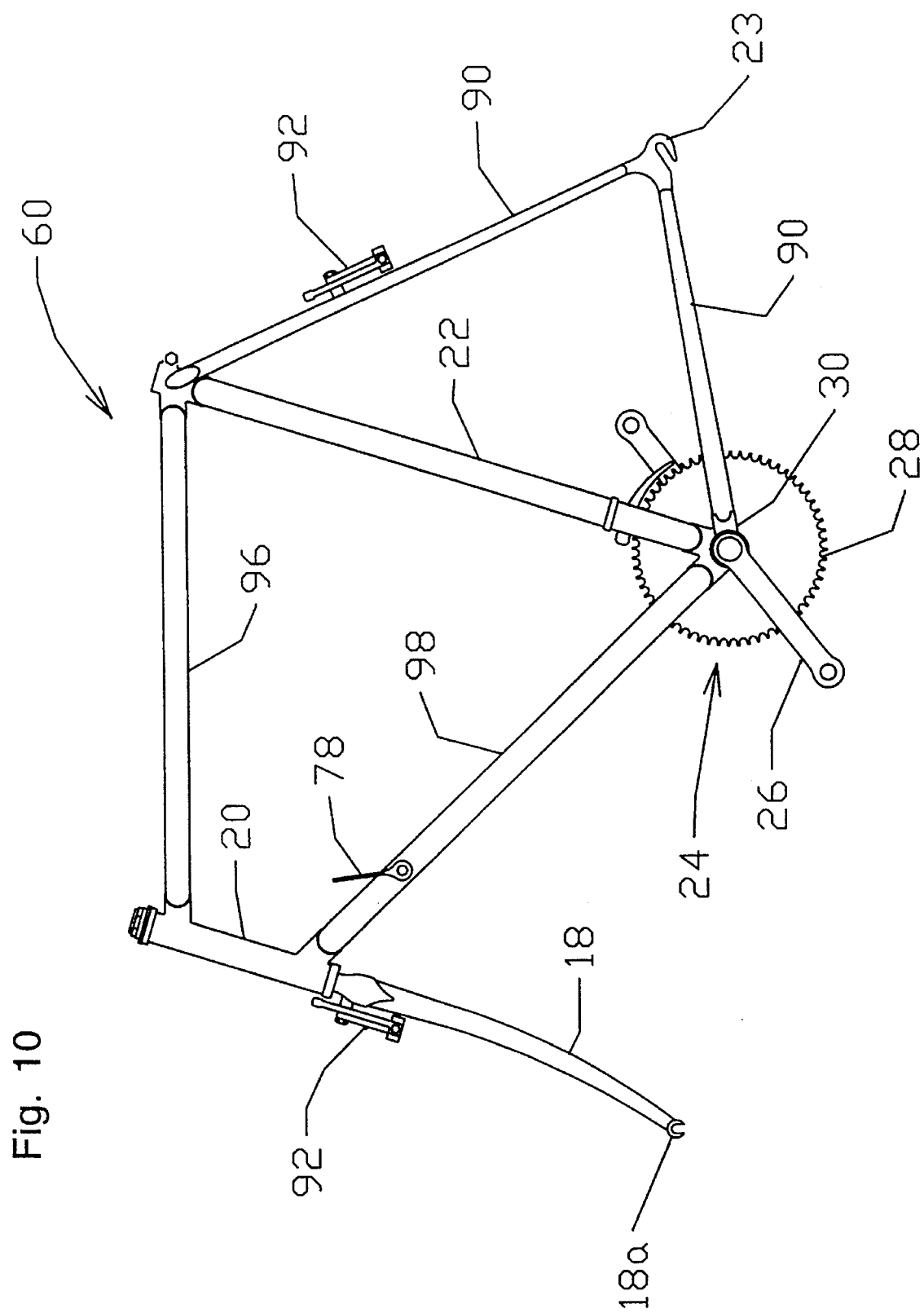
FIG. 10 is a view of a standard bicycle frame most typically used with the torque couplings of this invention.

Referring to the drawings, a system for storing a bicycle is shown. The system includes a coupling (50) for dividing a frame (60) of the bicycle into separate pieces (A, B) and a case (100) for storing and containing the individual parts of the bicycle.

With reference to FIGS. 1 through 5, a preferred form of the coupling (50) is shown. The coupling (50) includes a threaded lug (2), a removeable-shoulder lug (9), a coupling nut (5) and a removeable shoulder (4) with a groove (8) providing one form of a means to attach the shoulder (4) onto the removeable shoulder lug (9). The lugs (2, 9) are bored to fit over ends (1, 11) of a frame tube up to inner shoulders (14, 17) and have truncated, tapered clutch teeth (3, 7) cut on their adjacent ends.

The teeth (3, 7) on both lugs (2, 9) are identical and are radially oriented with tapered side surfaces (34), top surfaces (32) and bottom gap surfaces (36). Each tooth's top edge (38), made where the tooth's top (32) intersects the tooth's sides (34), being essentially parallel to the adjacent bottom edge (39) of the gap, made where the gap bottom surface (36) intersects the opposite sides (34) of two consecutive teeth (3, 7). Each tooth (3, 7) is angled from vertical with an outer extent of the top surface (32) closer to the opposite lug (9, 2) than an inner extent of the bottom surface (36). Each bottom surface (36) is angled from vertical with an inner extent of the bottom surface (36) closer to the opposite lug (9, 2) than an outer extent of the bottom surface (36). The effect is to produce tooth tops (32) and gap bottoms (36), that are essentially rectangular in nature, roughly the same size, and approximately parallel to one another. This gap (38) configuration facilitates manufacture in that the gap (38) exhibits an easily machined constant width.

Preferably, the bottom surface (36) is angled approximately 30 degrees from vertical. Preferably, the top surface (32) is angled approximately 30 degrees from vertical. Thus, the side surfaces (34) exhibit an approximately equilateral triangular form.

The teeth/gap arrangement produces teeth (3, 7) that allow full contact on all sides when meshed together. Truncation of such teeth (3, 7) at a tip (40) at an outer extent of the top surfaces (32) further prevents the teeth (3, 7) from bottoming out in the mating gaps (38) of the opposing lug (9, 2), eliminating all backlash when the coupling nut (5) is tightened. Backlash is also prevented by the taper of the teeth (3, 7). An angle of taper of the teeth is selected to provide the teeth (3, 7) with high resistance to torque and yet ease of intermeshing. The truncated tip (40) also facilitates future tightening to compensate for potential wear through repeated use. Many common manufacturing methods can be utilized to create the clutch teeth (3, 7). One method which has proven successful involves turning the lugs (2, 9) on a lathe and then machining the teeth (3, 7) with an appropriate tool.

To better distribute stress in the tubes (1, 11) caused by an increase in the cross sectional area where the tubes (1, 11) enter the lugs (2, 9), the tube accepting ends of the lugs (2, 9) have angles (12, 13) cut to form two points 180 degrees opposite each other, and the lugs' outer diameters taper to cause the lugs (2, 9) to be thinner approaching those points.

The coupling parts (2, 4, 5, 9) should be made from materials that will be as strong as the frame tubes (1, 11) when machined to the desired thickness and that will allow attachment of the coupling (50) by some means compatible with both materials, such as brazing, silver brazing, welding, adhesive bonding, etc., so the combination of tubes (1, 11) and couplings (50) will transmit all normal forces acting on the bicycle frame (60) without failure. As alloys and materials vary greatly, bicycle frame materials included, special care should be taken regarding the choice of materials, and the design, thicknesses and method of attachment and various adaptations of the above described coupling (50) may be necessary to create a rigid, durable connector.

In an alternative embodiment, shown in FIGS. 6 through 9, a differential thread torque coupling (250) is shown. The differential coupling (250) of this invention is much like the above description of the coupling (50) except that there is no removeable shoulder (4), the smaller outer diameter lug (259) replaces the removeable shoulder lug (9) and has no groove (8) in it, and the coupling nut (255) is cut with two different thread pitches to match those of the two lugs (252, 259), eliminating the shoulder that the retaining ring (4) is butted up against in the preferred embodiment. Specifically, a larger outer diameter lug (252) and a smaller outer diameter lug (259) are provided. Both lugs (252, 259) include threads (262, 264) on the outer surface. The smaller diameter lug (259) preferably has threads (264) which are more fine than the threads (262) of the larger diameter lug (252).

The nut (255) has threads (272, 274) on its inner surface (270). The inner surface (270) includes a lesser diameter portion (276) and a greater diameter portion (278). The greater diameter portion (278) supports threads (272) of similar pitch to the threads (262) of the larger diameter lug (252). The lesser diameter portion (276) supports threads (274) of similar pitch to the threads (264) of the smaller diameter lug (259).

A nut shoulder (277) separates the two portions (276, 278) of the inner surface (270). The shoulder (277) prevents the larger diameter lug (252) from damaging the threads (274). A lug shoulder (258) is located on the smaller diameter lug (259) and prevents the nut (255) from traveling off of the smaller diameter lug (259) and onto the tube (11). When the nut (255) is tightened, the nut (255) moves onto the larger diameter lug (252) faster than it moves off of the smaller diameter lug (259), thus compressing the lugs (252, 259) together.

Referring now to FIGS. 10 through 13, details of a process to determine the size of a case (100) needed for packaging a bicycle for travel that does not exceed the 62 inch total linear dimension limit typical of U.S. and international airlines is shown. This process determines what pieces a bicycle will need to be divided into to fit within such a case (100) including precise division of the frame (60) as well as additional case (100) features that will make a case (100) more versatile, and a method of packing the bicycle pieces so that all of the bicycle will safely fit in the case (100). In carrying out the invention, first one has to determine exactly what dimensions the chosen case (100) can have. Since wheels (62, 63) of the bicycle do not normally break down, a case (100) for a whole bicycle has to be large enough to include the wheel's heights and widths with room for other bicycle pieces somewhere in between.

Many standard wheels measure 25½" on their outer diameters and total 9½" in their combined widths. With this wheel size, case (100) sizes such as 26"×26"×10" and 25¾"×25¾"×10½" and whose total height, width and girth (i.e. thickness) measurements equal the 62" maximum are possible (see FIGS. 15–17). However, other case (100) sizes are also possible. There are multiple possibilities depending upon the size of the wheels (62, 63) and the way the bicycle pieces can be arranged. A slightly larger wheel (62, 63) would make the case (100) larger in height and width, and thinner in girth. A smaller wheel (62, 63) would allow the opposite so long as the size of the pieces (A, B) the frame (60) can be divided into is considered. A standard bicycle's wheel size does not vary so greatly as to make a noticeable difference in the way a bicycle's frame pieces (A, B) and wheels (62, 63) can be divided and packaged in a case. The remainder of the bicycle parts, removed from the frame (60), fit in between the wheels (62, 63) and frame pieces (A, B) in a properly proportioned 62 inch total linear dimension case.

Figure 18:
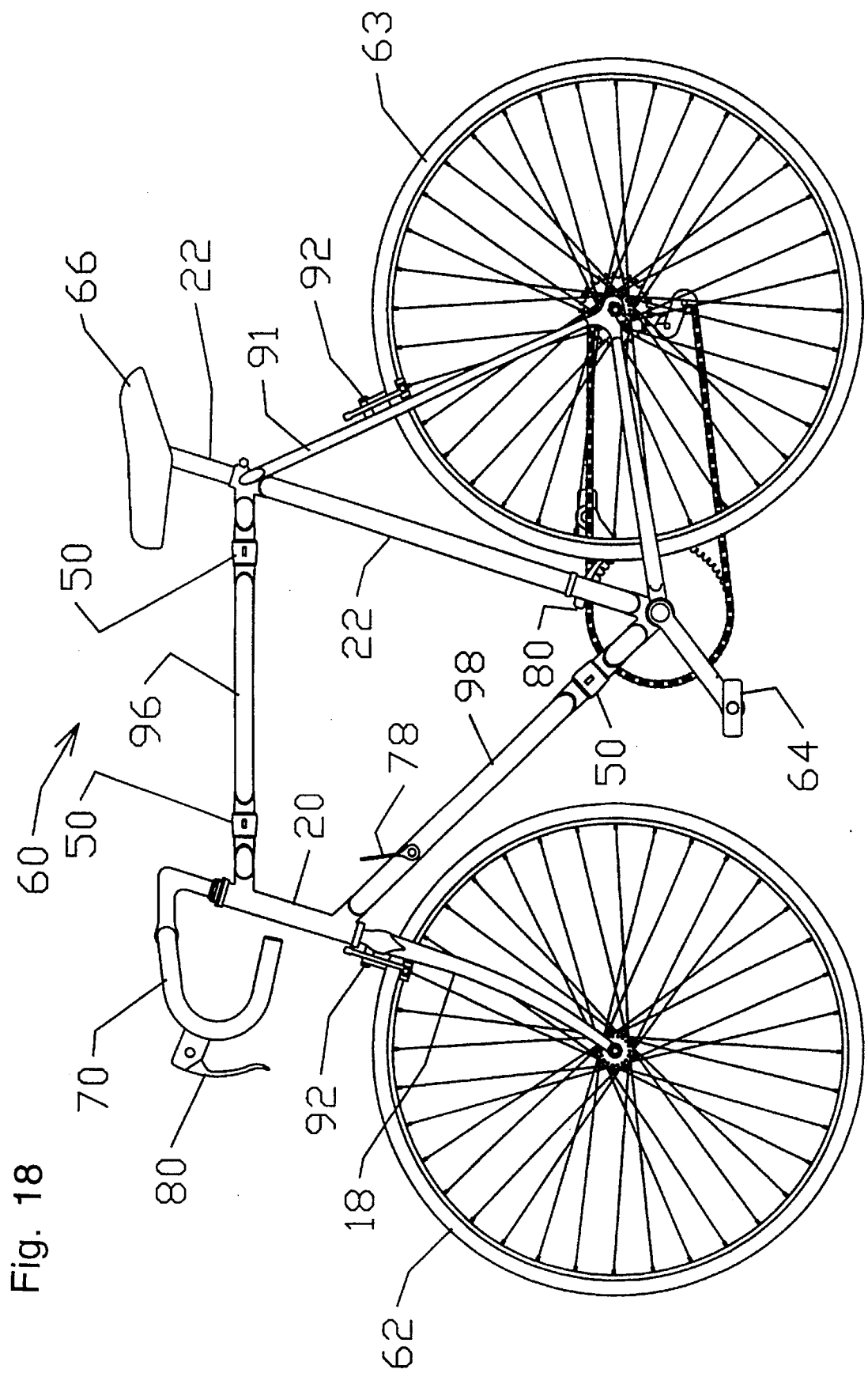
FIG. 18 is an elevational view of an assembled bicycle with three couplings installed (cables removed for clarity).
Figure 22:
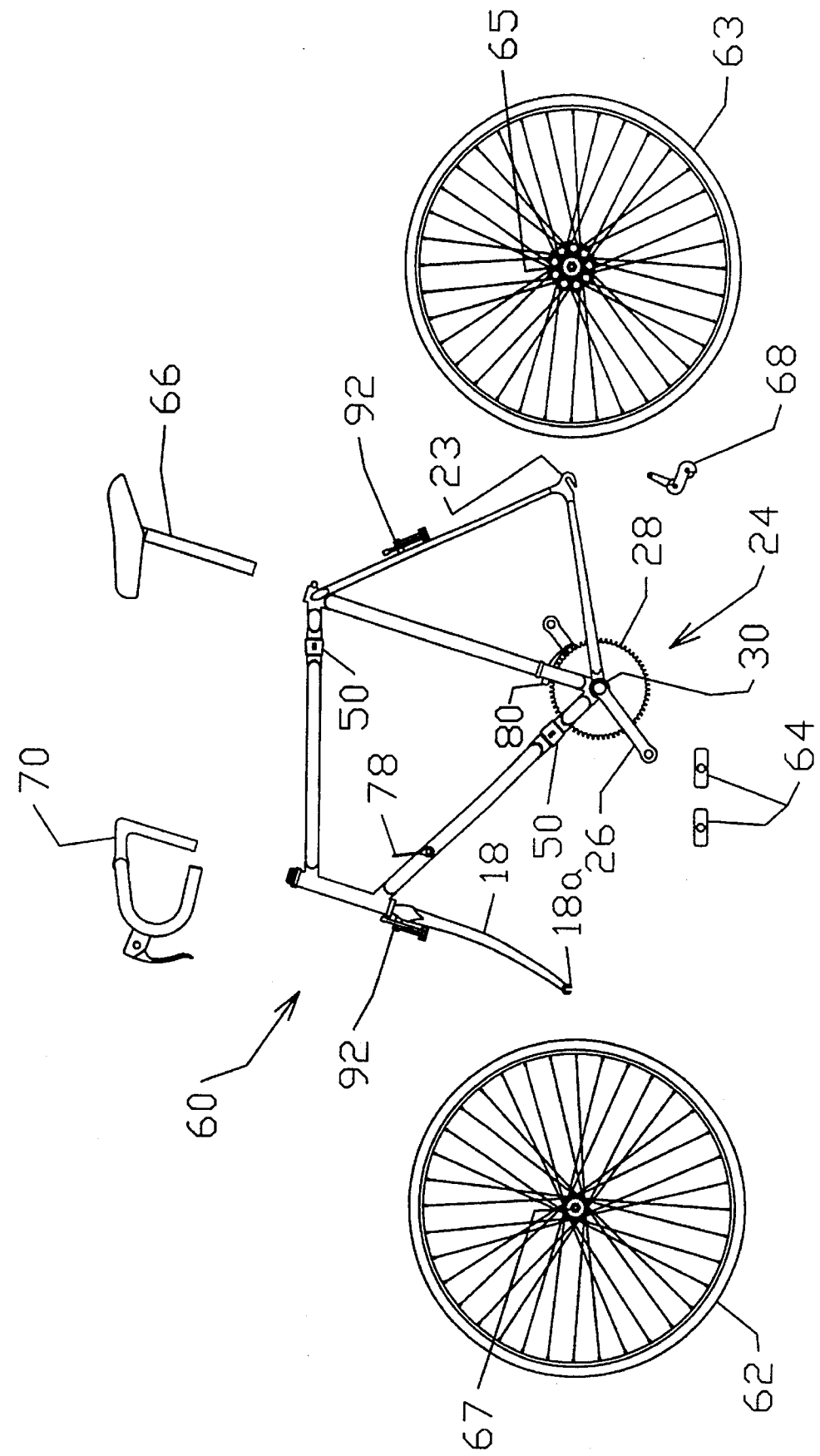
FIG. 22 is a view of a bicycle, fitted with two torque couplings with seat, handlebars, pedals, rear derailleur, and wheels off (cables and chain removed for clarity).
Figure 23:
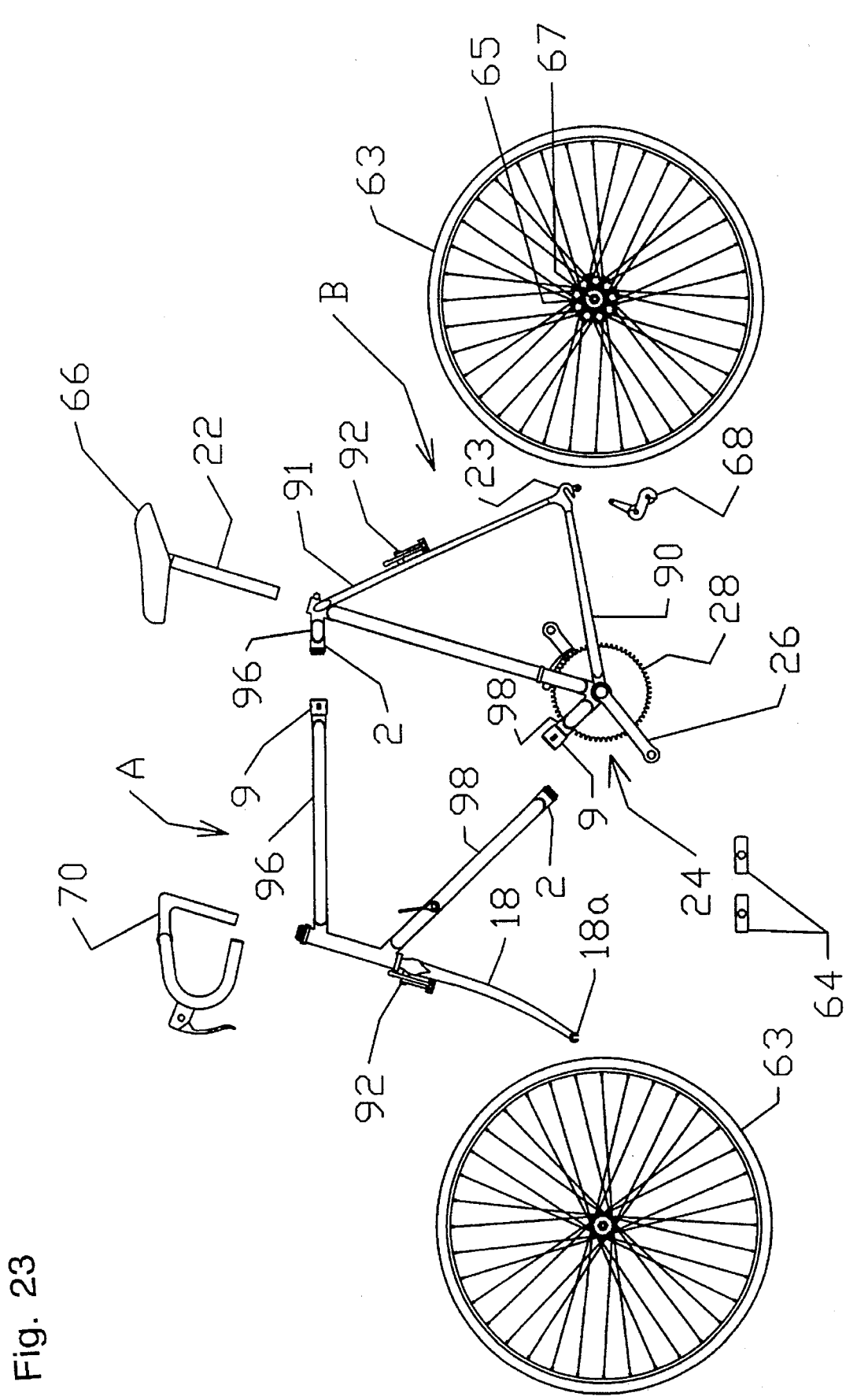
FIG. 23 reveals that which is shown in FIG. 22 but with frame pieces separated at the couplings.
Figure 32:
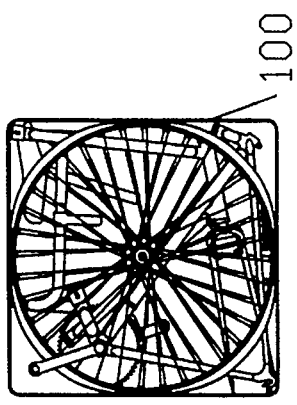
FIGS. 30 through 32 are sequential views of an alternative embodiment of that which is shown in FIGS. 24 through 29 following that which is shown in FIG. 26 with FIG. 30 showing the front frame piece on the wheel with the brake unit up and the fork tips in the lowest corner.
Figure 34:
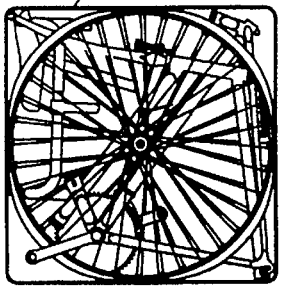
FIGS. 33 and 34 reveal an alternative embodiment of that which is shown in FIGS. 24 through 29 following that which is shown in FIG. 27, FIG. 33 showing the front section of the frame on top of the rear section of the frame with fork tips in the highest corner, one fork going through the spokes of the lower wheel, the other fork going over the handle bar, and the head-tube near the seat-tube lug, the top tube of the front section runs down along the seat-stay of the rear section, and the down tube of the front section runs along the seat tube of the rear section of the frame.
Figure 30:
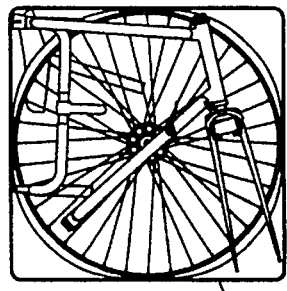
Figure 31:
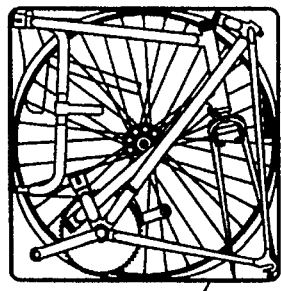
Figure 33:
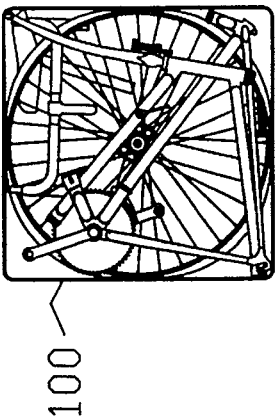

A standard bicycle generally is a bicycle having a frame composed of individual tubes and fairly standard "700C" wheels such as that shown in FIG. 18. "700C" wheels have an approximately 26 inch diameter when a tire thereon is deflated. Other common names for such a bicycle are "racing" or "touring" bicycles. "Mountain bikes" having wider wheels of similar diameter and modified handlebars are also contemplated as within the definition of a standard bicycle. While frame sizes vary, the wheels are sized fairly standard at approximately 26 inches in diameter.

The couplings (50, 250) make it possible to break the frame (60) down into smaller pieces (A, B) for packing, and then reassemble the pieces (A, B), putting various standard components (80) of the bicycle back on the frame (60), to produce a bicycle that rides exactly like the original. A front piece (A) would likely include a head tube (29) of the frame (60) and a rear piece (B) would likely include a bottom bracket (30) of the the frame (60). The fewer the pieces removed from the frame (60), the simpler the disassembly and assembly. Precise location of the couplings (50, 250) allows the frame (60) to be divided into as few pieces as possible that will still fit inside the case (100).

Figure 11:
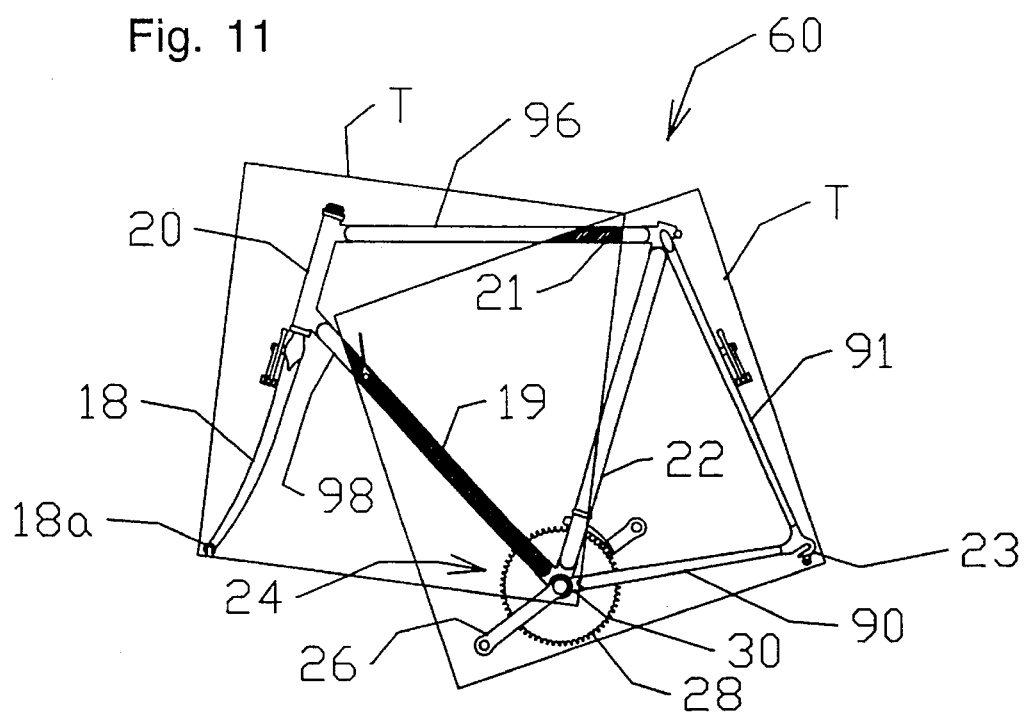
FIG. 11 is a view of templates over the frame for marking the frame before cutting and placement of the couplings.

Installation of torque couplings (50, 250) to yield bicycle frame (60) pieces (A, B) that will fit the parameters of a desired case (100) first involves comparing the major dimensions of the case (100) to the frame (60). This is best accomplished by making two square templates (T) having the height and width of the case (100) to be used (FIG. 11). Approximately 26"×26" cardboard squares are satisfactory because they are close to the greater dimensions of the case (100) which wheels (62, 63) fit within when the tires are deflated. For best results, an exact sized template should be used.

Preferably, the frame (60) is only divided into two pieces. For this to occur, these templates (T) must be adjusted on the front and rear anticipated sections of the bicycle until each component (80) that cannot or will not be removed for packing the bicycle in a case (100) is totally within the area defined by at least one template (T) (see FIG. 11). This can include, but is not limited to: (inside the dotted area on the left in FIG. 11) the top of the head-set (20) the tip of the forward fork (18), and (inside the dotted area on the right in FIG. 11), the entire seat tube (22), the lowest tip of the rear wheel drop out (23) where the derailleur connects, and the crank set assembly (24).

Figure 12:
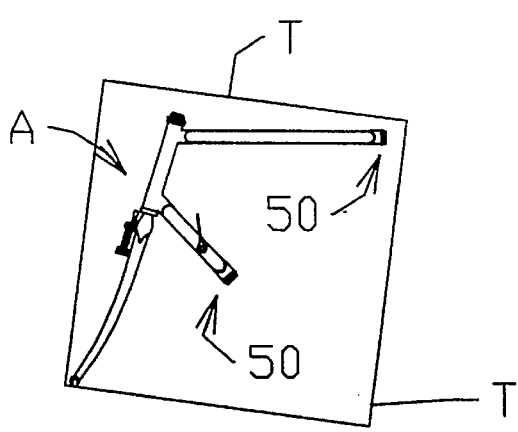
FIG. 12 is a view of the front piece of the bicycle frame from FIG. 11 with threaded lugs installed.
Figure 13:
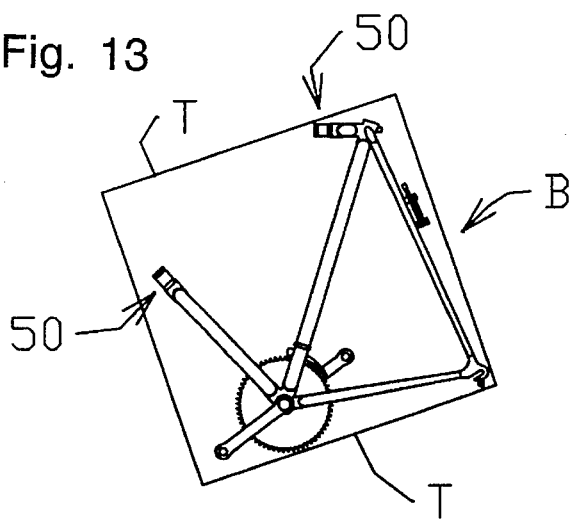
FIG. 13 is a view of the rear piece of the bicycle frame from FIG. 11 with removeable collar lugs installed.

The overlapping areas (19, 21) of the templates (T) on the top tube (96) and down tubes (98) in FIG. 11 identify where the templates (T) overlap on those tubes (96, 98). This is where the couplings (50, 250) are to be inserted and where the center lines of the couplings (50, 250) must be after installation. Typically, area (21) is very small and requires exact placement of the couplings (50, 250), while area (19) is quite large and will allow for much adjustment in the placement of the couplings (50, 250). FIGS. 12 and 13 show the couplings (50, 250) installed within the overlapping areas (19, 21). In this example, the threaded lugs (2) are in FIG. 12, and the removeable shoulder lugs are in FIG. 13. Again, note the position of the coupling (50) center lines within the overlapping areas (19, 21) of the templates (T).

If it is not possible to get overlapping between the front and rear orientations of the templates on the top or down tube (96, 98) or both (FIG. 6), there are two options to overcome this problem. One is removing the chain ring (28) and realigning the templates (T) for more overlap The other is to divide the tubes (96, 98) that don't have an overlap on them in more than two places (FIG. 18). The dividing lines of the couplings (50, 250) will each have to be within the boundaries of either a front or rear template (T) position.

Choosing a place outside those template (T) positions would, just like choosing a place outside of an overlapping area (19,21) which was discussed above, leave a frame section (A, B) with a part that would not fit in the case (100).

To preserve the original geometry of the bicycle frame (60), as is one object of this invention, the exact length of tubing (1, 11) that will be replaced by the coupling (50, 250), from inner shoulder (14) to inner shoulder (17) (FIG. 3) of the lugs (2 and 9) (FIG. 1) should be cut out, keeping in mind positions of previously brazed on lugs, cable guides, etc. that may interfere with the couplings. New tubes (1, 11) can also be utilized to replace the previous tubes (96, 98).

For best results, the frame (60) is marked within the overlap area and an appropriate portion of the tube (96, 98) is removed to preserve the original frame geometry. If the mark is too close to an obstruction on the tube (1, 11) it should be moved to have 2 inches of clearance. Repositioning or replacing some of these parts may be necessary. As before mentioned, methods of securing the lugs (2, 9) to the frame vary, depending on the material the lugs (2, 9) and frame (60) are made of. In one case, when the couplings (50) are made from stainless steel the couplings (50) can be, silver brazed on to carbon steel frame tubes (1, 11).

Use of good frame building techniques is preferred in the installation of torque couplings (50, 250) on a bicycle frame (60). Because tube designs, materials and wall thicknesses vary, only a qualified frame builder who knows the relative stresses a frame undergoes and in what areas those stresses occur, can likely adequately perform the installation.

If the removeable shoulder coupling (50) is used on a frame (60) (FIGS. 1 through 5), once the lugs (2, 9) are attached to the frame tubes (1, 11), each coupling nut (5) is slid onto its mating removeable-shoulder lug (9) until the removeable shoulder (4) can be put on. On one coupling (50), retaining rings in a groove (8) have been used with success, but the removeable shoulder (4) could be one of many configurations with multiple attachment methods, such as threading, set screws, slots, pins, etc. The removeable shoulder (4) functions with the coupling nut (5) to pull frame pieces (A, B) together. A tapered shoulder (10) is located on the removeable lug (9) to meet a tapered shoulder (16) in the coupling nut (5). This prevents the nut (5), when unscrewed, from falling off the back side of the lug (9) and scratching the frame paint. The nut (5) and the removeable shoulder (4) are also easily replaceable if they get damaged.

During frame (60) assembly, the coupling nut (5) threads onto the threaded lug (2) and pulls the removeable-shoulder lug (9) axially by shoulder (15) of the coupling nut (5) engaging the removeable shoulder (4). This interlocks the clutch teeth (3, 7). After tightening the coupling nut (5) with a spanner wrench in slots (6) which are cut in the nut (5), a force transmitting union, equal in strength or greater than that of the original tube (96, 98), is formed. If the coupling's teeth (3, 7) do wear, further tightening of the coupling nut (5) will take up any backlash with a negligible change in the frame tube (96, 98) length.

If the differential thread coupling (250) (FIGS. 6 through 9) is used, it is only slightly different in application. The coupling nut (255) begins totally screwed onto the fine threaded lug (255). The tapered teeth (3, 7) of the course threaded lug and of the fine threaded lug (259) are firmly meshed together. The nut (255) is started onto the course threaded lug (252). It threads onto that lug (252) faster than it threads off of the fine threaded lug (259), thus pulling the two lugs (252, 259) together. Tightening with a spanner wrench will, as before, form a tube union with strength equal to or greater than the original tube (96, 98). If the teeth (3, 7) wear, they can be drawn further together by tightening the coupling nut (255) more.

Once the couplings (50, 250) are installed in the frame (60), it is necessary to be able to pack the bicycle in a small case (100) so that it can be taken in its condensed form to any destination without delays or extra charges from airlines or other carriers due to large, difficult to handle boxes or cases. FIGS. 15 through 19 and 22 through 34 reveal details of the packing procedures of this invention. There are many ways to package a bicycle that has a torque coupling system installed in its frame (60), some of which depend upon the exact location of the couplings (50, 250).

Figure 14:
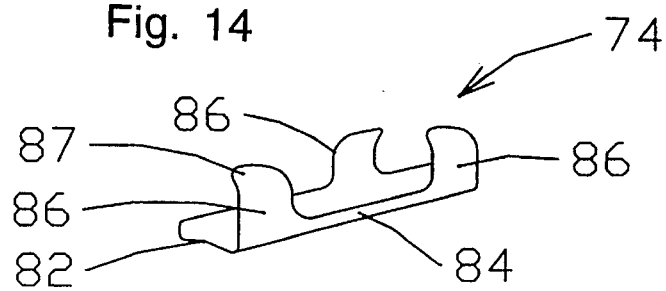
FIG. 14 is a perspective view of a quick connect cable clip that is used to make sheathed component cables quickly removeable from the frame pieces.

Component cables routed through cable guides can restrict or eliminate the flexibility just mentioned. A quick connectable clip (74) can be used to handle this problem. The quick connect cable clip (74) (FIG. 14) allows restrictive sheathed cables to be removed from the frame tubes (96, 98) and put back again quickly without tools that would be needed to loosen straps, clips, or remove cables from components (80) or levers (78) on one end so the sheaths can be pulled through the brazed-on cable guide loops on the frame (60). Once the cable sheaths are in the clip (74), they will not come out on their own.

Quick connect cable clips (74) are to be silver brazed to bicycle tubes (96, 98) that sheathed cables run along from the actuating levers (78) to the components (80). They are made so that a sheathed cable can be inserted in or taken out easily, but not fall out on its own during regular bicycle use. They have bases (82) and sides (84) whose inner dimensions just exceed the outer diameter of typical component cable sheaths. The sides are actually fingers (86) that go up and curve in on the top (87) to be over the cable sheath when it is inside the clip (74). The fingers (86) alternate from side to side with enough space in between them for the sheath to fit in and around the fingers (86).

The sheathed cable is to be hooked around and under one of the outside fingers (86), bent slightly to fit under and around the center finger (86), and bent again to fit under and past the last finger (86). It can then be stretched straight and will not fall out of the clip (74). These clips (74) are to replace the normal screw together, snap together, or complete loop cable guides that require tools to remove the restrictive sheathed cables from them and thus the frame tubes (96, 98) to get the needed flexibility for packaging a broken down bicycle without the use of tools to free the cables from the frame (60). Three clips (74) in a row gives the best guidance for the cable sheaths.

For packing purposes, removing the handlebars (70) from the frame (60) so they will fit inside the case (100) with the frame pieces (A, B), and releasing the cables (72) that are attached to the handlebars (70) from the bicycle frame (60), through use of the quick connect cable clips (74), adds much flexibility to the frame sections (A, B). In some rare cases, it may also be necessary to remove the derailleur levers (78) from the frame (60) because the cables in them hold and restrict the frame pieces (A, B) from amply moving as well.

As it is not convenient to totally strip a bicycle frame (60) to get the flexibility needed to fit it and the entire bicycle easily in a case (100), this packing method only removes those parts that would extend beyond the boundaries of the case (100). In a typical example, a case (100) that measures a total of 62 inches in height, width, and girth will not contain a bicycle without first removing (see FIGS. 22 and 23) the wheels (62, 63), handlebar assembly (70) (loosening the cables attached to it from the frame tubes (1, 11) through use of quick connect cable clips (74)), seat assembly (66), rear derailleur (68) and pedals (64).

If the bicycle has "quick release" type wheels, the nuts (88) and skewers (89) must be removed because they make the wheels (62, 63) too wide to safely fit in the case (100). If conditions dictate, the chain ring (28), crank arms (26) and the front forks (18) can also be removed. However, it is often the case that if all of the frame (60) (fork (18) and crank set (24) included) can be fit inside two templates (T) the size of the case (100), the bicycle will fit in the case (100) without removing those parts.

FIGS. 22 through 34 show a method for disassembling a bicycle that is fitted with two couplings (50, 250), into pieces (A, B). Once a bicycle has been divided and disassembled, any order can be used to package the frame pieces (A, B) and wheels (62, 63) so long as they are parallel to the two square surfaces (150, 160). FIGS. 24 through 29 are believed to show the preferred way to package the frame pieces (A, B) and wheels (62, 63) of a bicycle fitted with two torque couplings (50, 250) without disconnecting any of the cables from their respective components (80) because it leaves larger empty spaces for other bicycle parts to be fit in.

Figure 25:
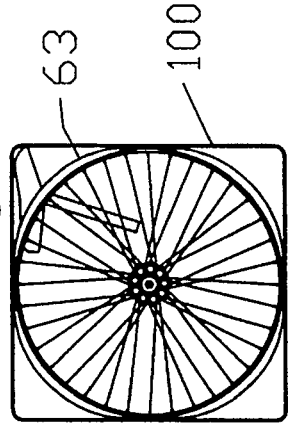
FIGS. 24 through 29 are sequential views of a case interior with various components being placed therein in sequence.
Figure 27:
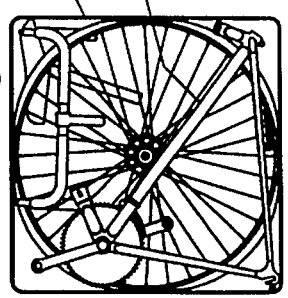
Figure 29:
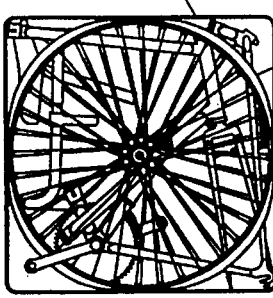
Figure 24:
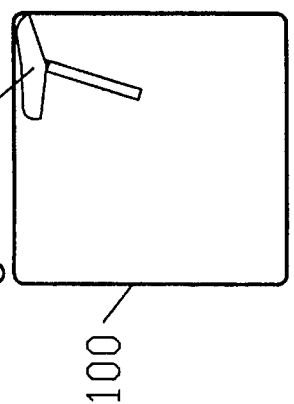
Figure 26:
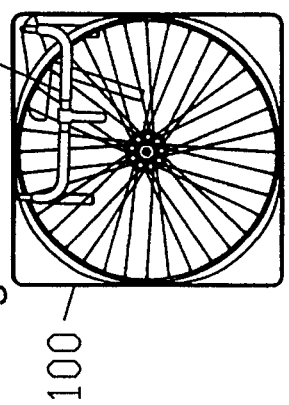
Figure 28:
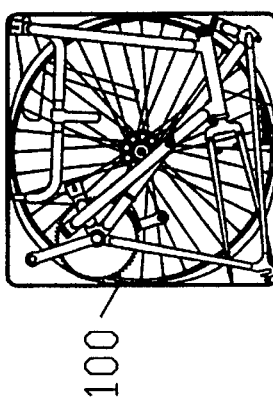

The first step is to lay the rear wheel (63), cog (65) down, in the case (100) as shown in FIGS. 24 through 26 (note that the handlebars (70) and seat (66) are only put in the case in these positions as they fit here best for this and a few other methods of packing). Next, the rear section (B) of the frame (60) is laid on the rear wheel (63) with the rear drop outs (23) (FIG. 27) in one corner and tilt the wheel (63) and frame piece (B) down toward that corner so the stays (90) and dropouts (23) will all fit in the case (100). Next, the front section (A) of the bicycle frame (60) is laid on top of the rear section (B) of the frame (60) with the same top to bottom orientation and a reverse front to back orientation from the orientation of the rear section (B) (FIG. 28). The fork tips (18a) are turned down and put between the chain stays (90). At the same time, the brake calipers are located between the seat tube (22) and the seat stay (91). Next, the remainder of the bicycle parts are fit in the available spaces (the seat (66) and handlebars (70) have already been noted). Lastly, the front wheel (62) is placed on top (FIG. 29).

FIGS. 30 through 34 show additional methods of packaging the bicycle frame sections (A, B), wheels (62, 63) and other parts. However, these examples are not intended to be an exhaustive list of the ways to package a bicycle fitted with torque couplings (50, 250) that is divided up into pieces. By loosening the derailleur levers (78) from the frame tubes (96, 98), even more packaging methods are provided because the frame parts (A, B) can then be put on either side of the wheels (62, 63), or both and all places in between so long as the parts do not stack too high to be accommodated by the girth of the chosen case (100). It is preferred to keep the wheels (62, 63) and frame pieces (A, B) close to parallel to the square surfaces (150, 160) of the case (100), only tilting them slightly to allow the wider areas of the frame (60) to fit the girth of the case (100). All other bicycle parts and accessories that were removed from the frame (60) for packing can still be fit in between the wheels (62, 63) and frame sections (A, B) in the open spaces discussed above.

Though not necessary, it is advantageous to keep the frame pieces (A, B) close together and in between the wheels (62, 63), if the cables are all left attached to their respective components. It is similarly advantageous if the cables are detached from their respective components (80), to pack them on opposite sides of one or both wheels (62, 63). If more than two couplings (50, 250) are used on a bicycle, there are even more ways to package the bicycle pieces because more parts are free to be moved around.

Using this prescribed method of dividing a bicycle and frame (60) results in successfully packing a standard bicycle with at least two couplings (50, 250) inside a case (100) that does not exceed 62 total inches in height, width and girth.

In all methods of packaging, putting padding (230) around the tubes (96, 98) protects the frame tubes (96, 98) from abrasion and scratching (FIGS. 20A through 21B). Other accessories to be protected can be similarly surrounded with padding (230). While numerous types of padding could work somewhat, the preferred method is to use a firm piece of cloth (231) backed with foam (232) and having a continuous closure means (234) to totally wrap and hold the tubes (96, 98) from end to end. By notching and cutting the pieces of cloth (231) in places where there are cross braces, accessories and drop outs, a good fit is obtained. The padding (230) thus includes cloth (231) having a length (236) similar to a length of tube (96, 98) to be covered and a width (238) slightly greater than a circumference of the tubes (96, 98). The closure (234) is located along a long edge (239) of the cloth (231). The padding (230) forms a sleeve surrounding the tubes (96, 98).

The proper installation of the torque couplings (50, 250) on a bicycle frame (60) and packaging of that standard bicycle as described above depends largely upon a certain sized case (100) for all the parts of the bicycle to be able to fit inside its boundaries. However, even though a case (100) is large enough for the wheels (62, 63), frame pieces (A, B), components (80) and accessories to fit, there are still features that a case (100) can have for use in this manner that add to its durability and usability.

One case (100) (FIGS. 15 through 17) that adequately packages the bicycle is soft sided and lined on its face, back, top, bottom and sides with thin plastic polyethylene sheets to resist punctures and prevent direct contact with bicycle parts inside the case (100). The case (100) includes a first square surface (150) of approximately 26 inches in height and length and a second square surface (160) of similar shape spaced therefrom and parallel thereto. Four planar side surfaces (170) surround sides of the square surfaces (150, 160). Two surfaces (170) are oriented perpendicular to two other surfaces (170). Edges (180) of the side surfaces are connected together at rights angles.

There are two large pockets (172) on each square surface (150, 160) with a centered seam (174) between them that clothing and other soft things can be packed in to act as padding and protect the parts of the bicycle inside the case (100) from outside shocks. In packing of the bicycle parts, the axles (67), being in the center of the wheels (62, 63), will be somewhere close to these seams (174) unless a frame member (A, B) is placed between the wheels (62, 63) and the side of the case (100). Thick padding packed in these two large pockets (172) will cause the case (100) to bulge somewhat and keep most loads from ever directly contacting the axles (67). The pockets thus provide one form of a bulging means for the case (100). A zipper (200) passes through the edges (180) of three of the four sides surfaces (170) in a plane parallel to the square surfaces (150, 160).

The height of the case (100) results in the case (100) often impacting the ground when in use. Hence, lower corners of the case (100) have zipper abrasion protectors (202) made from thick, scuff resistant material. FIGS. 15 through 17 show extra straps (190) that cross the zipper (200) area in two perpendicular directions to add further strength to the case's (100) holding power and support a handle (220). Each strap (190) includes a tethered portion (192) attached to the case (100) and two free ends (194). The free ends include connectors (196) at their extremities which connect together around the case (100). FIG. 17 also shows three "D" rings (210) that can be used to attach straps to the case (100) so it can be carried on a bearer's back with hands free. Items in the pockets (172) protect a wearer of the case (100) on the wearer's back from having bicycle parts impact the wearer through the case (100) and cause discomfort. A handle (220) couples to the straps (190) and includes an inner cylinder (222) centered on one strap (190) and a centered outer wrap (224) on an adjacent strap (190) for surrounding the inner cylinder (222). A connector (226), such as a hook and loop type material on the outer wrap (224) allows the two straps (190) to be held together to form the handle (220). However, snaps, hooks and eyes, buttons or other connectors could also be used.

A hard sided case can also be used with this torque coupling system. It can protect the bicycle parts from compression better than the soft sided case (100), but does not afford some of the flexibility or extra packing spaces that the soft sided case (100) exhibits. Any hard case would likely need to conform to the same size restrictions as a soft sided case (62 total inched in height, width and girth) and it would likely need small radiuses in the corners to optimize the space the bicycle parts will need to fit in.

Moreover, having thus described the invention, it should be apparent that numerous structural modifications and adaptations may be resorted to without departing from the scope and fair meaning of the instant invention as set forth hereinabove and as described hereinbelow by the claims. For instance, a tandem bicycle could be divided, likely into three separate frame pieces, and be fit into a case for transport on a common carrier.

I claim:

1. A case comprising, in combination:

an exterior surface formed of flexible material, said exterior surface forming a periphery of the case including peripheral side surfaces, an interior volume dimensioned to receive a disassembled bicycle when the bicycle has handlebars, seat and two 25½ (twenty-five and one-half) inch wheels all of which are removed from its frame, and its frame is in at least two pieces, and wherein its frame is formed from a series of connected tubes having a diameter and lengths and having means to separate the tubes to form the two pieces, wherein at least one said wheel touches an interior of each said side surface substantially at a mid point of said surfaces when the wheel is within said case, means for distributing forces passing through said exterior surface, coupled to said exterior surface, said exterior surface including two similarly sized square surfaces oriented in a parallel, spaced relationship with each other, each said square surface having a height and width just greater than or equal to a 25½ (twenty-five and one-half) inch diameter of the wheels of the disassembled bicycle, wherein each said square surface of said exterior surface includes two or more pockets therein, said pockets oriented adjacent each other with a seam therebetween, said seam passing over a geometric center of said square surface, whereby a user can place items within said pockets and diminish the presentation of compressive loads at said geometric center of the square surfaces, thereby preventing axles of wheels placed within said case form receiving damaging compressive loads, wherein said square surfaces' height or width is not greater than 26 inches, wherein an aggregate of said height, width and a thickness between said square surfaces are dimensioned to be less than 62 (sixty-two) inches, wherein said force distributing means is a planar layer of semi-rigid sheet material oriented adjacent an interior of said exterior surface, wherein said case includes a plurality of detachable sleeves of flexible material, each said sleeve having a substantially rectangular shape when lying flat with a width greater than the diameter of said tubes of the bicycle, a length similar to the length of said tubes of the bicycle, and a hook and loop fastener oriented along long edges of said sleeve;

whereby said sleeve can be wrapped around said tubes of the bicycle and connect thereto within said case to further prevent a bicycle within said case from damage, wherein a plurality of straps including tethered portions and free ends are included, said tethered portions being attached to portions of said exterior surface and said free ends including connectors at ends thereof, said free ends extending a distance from said tethered portions sufficient to completely surround said case with said connectors at said free ends coupling together, said case including four said side surfaces which space said square surfaces away from each other, two of said side surfaces oriented vertically and two of said side surfaces oriented horizontally, and said straps are oriented to surround the case while either surrounding said square surfaces and said vertical side surfaces or said square surfaces and said horizontal side surfaces, said side surfaces of said exterior surface include four corners therebetween, and wherein a zipper passes over each of said four corners and completely bisects three of said four side surfaces, whereby said case is openable and closeable for loading and unloading, and wherein said zipper includes a beginning end and an ending end, and wherein a removable patch of material covers said ends of said zipper over two said corners of said case closest to said ends of said zipper, whereby said zipper is protected from damage.

2. A case comprising, in combination:

an exterior surface formed of flexible material, said exterior surface forming a periphery of the case, an interior volume dimensioned to receive a disassembled bicycle when the bicycle has handlebars, seat and two 25½ (twenty-five and one-half). inch wheels all of which are removed from its frame, and its frame is in at least two pieces, and wherein its frame is formed from a series of connected tubes having a diameter and lengths and having means to separate the tubes to form the two pieces, means for distributing forces passing through said exterior surface, coupled to said exterior surface, and said exterior surface including two similarly sized square surfaces oriented in a parallel, spaced relationship with each other, each said square surface having a height and width greater than a 25½ (twenty-five and one-half) inch diameter of the wheels of the disassembled bicycle, wherein each said square surface of said exterior surface includes two or more pockets therein, said pockets oriented adjacent each other with a seam therebetween, said seam passing over a geometric center of said square surface, whereby a user can place items within said pockets and diminish the presentation of compressive loads at said geometric center of the square surfaces, thereby preventing axles of wheels placed within said case form receiving damaging compressive loads, wherein said square surfaces' height or width is not greater than 26 inches, wherein the total of said height and width and a thickness is not greater than 62 inches, wherein said force distributing means is a planar layer of semi-rigid sheet material oriented adjacent an interior of said exterior surface, wherein said case includes a plurality of detachable sleeves of flexible material, each said sleeve having a substantially rectangular shape when lying flat with a width greater than the diameter of said tubes of the bicycle, a length similar to the length of said tubes of the bicycle, and a hook and loop fastener oriented along long edges of said sleeve;

whereby said sleeves are wrapped around said tubes of the bicycle and connect thereto within said case to further prevent the disassembled bicycle within said case from damage, wherein a plurality of straps including tethered portions and free ends are included, said tethered portions being attached to portions of said exterior surface and said free ends including connectors at ends thereof, said free ends extending a distance from said tethered portions sufficient to completely surround said case with said connectors at said free ends coupling together, said case including four side surfaces which space said square surfaces away from each other, two of said side surfaces oriented vertically and two of said side surfaces oriented horizontally, said straps are oriented to surround the case while either surrounding said square surfaces and said vertical side surfaces or said square surfaces and said horizontal side surfaces, wherein said side surfaces of said exterior surface include four corners therebetween, and wherein a zipper passes over each of said four corners and completely bisects three of said four side surfaces, whereby said case is openable and closeable for loading and unloading, and wherein said zipper includes a beginning end and an ending end, and wherein a removable patch of material covers said ends of said zipper over two said corners of said case closest to said ends of said zipper, whereby said zipper is protected from damage.

3. The case of claim 2 wherein at least one of said square surfaces includes rings attached thereto, said rings pivotable away from said square surfaces to allow access through a center of said rings, whereby the case may be tethered to another object such as additional straps for placement and support upon a wearer.

4. A case comprising, in combination:

an exterior surface formed of flexible material, said exterior surface forming a periphery of the case, an interior volume dimensioned to receive a disassembled bicycle when the bicycle has handlebars, seat and two 25½ (twenty-five and one-half) inch wheels all of which are removed from its frame, and its frame is in at least two pieces, and wherein its frame is formed from a series of connected tubes having a diameter and lengths and having means to separate the tubes to form the two pieces, means for distributing forces passing through said exterior surface, coupled to said exterior surface, and said exterior surface including two similarly sized square surfaces oriented in a parallel, spaced relationship with each other, each said square surface having a height and width greater than a 25½ (twenty-five and one-half) inch diameter of the wheels of the disassembled bicycle, said case including four side surfaces which space said square surfaces away from each other, two of said side surfaces oriented vertically and two of said side surfaces oriented horizontally, wherein said side surfaces of said exterior surface include four corners therebetween, and wherein a zipper passes over each of said four corners and completely bisects three of said four side surfaces, whereby said case is openable and closeable for loading and unloading, and wherein said zipper includes a beginning end and an ending end, and wherein a removable patch of material covers said ends of said zipper over two said corners of said case closest to said ends of said zipper, whereby said zipper is protected from damage, wherein at least one of said square surfaces includes rings attached thereto, said rings pivotable away from said square surfaces to allow access through a center of said rings, whereby the case may be tethered to another object such as additional straps for placement and support upon a wearer, and including thin sheets of puncture resistant material on said square surfaces, including reinforcing straps attached to an outer surface of said case, and including a handle coupled to said straps which are attached to said case, said handle including a wrap overlying an inner cylinder.

* * * * *